(12) United States Patent
Hu et al.

(10) Patent No.: US 11,464,156 B2
(45) Date of Patent: Oct. 11, 2022

(54) MONITORING SYSTEM AND MONITORING METHOD FOR SEEDER

(71) Applicant: JIANGSU UNIVERSITY, Jiangsu (CN)

(72) Inventors: Jianping Hu, Jiangsu (CN); Wei Liu, Jiangsu (CN); Jiaming Luo, Jiangsu (CN); Lvhua Han, Jiangsu (CN); Deyong Yang, Jiangsu (CN); Lili Dong, Jiangsu (CN)

(73) Assignee: JIANGSU UNIVERSITY

( * ) Notice: Subject to any disclaimer, the term of this patent is extended or adjusted under 35 U.S.C. 154(b) by 396 days.

(21) Appl. No.: 16/474,514

(22) PCT Filed: Jul. 13, 2018

(86) PCT No.: PCT/CN2018/095530
§ 371 (c)(1),
(2) Date: Jun. 27, 2019

(87) PCT Pub. No.: WO2019/080545
PCT Pub. Date: May 2, 2019

(65) Prior Publication Data
US 2020/0245531 A1 Aug. 6, 2020

(30) Foreign Application Priority Data

Oct. 26, 2017 (CN) .......................... 201711012908.4

(51) Int. Cl.
*A01C 7/10* (2006.01)
*H02P 29/20* (2016.01)
(Continued)

(52) U.S. Cl.
CPC ............ *A01C 7/105* (2013.01); *A01B 79/005* (2013.01); *G01S 19/14* (2013.01);
(Continued)

(58) Field of Classification Search
CPC ...................................................... A01C 7/105
See application file for complete search history.

(56) References Cited

U.S. PATENT DOCUMENTS 5,684,691 A * 11/1997 Orbach ................ A01B 63/112
701/50
5,956,255 A   9/1999 Flamme .................... 364/479.14
(Continued)

FOREIGN PATENT DOCUMENTS

| CN | 102096378 | 6/2011 | ............... A01C 7/00 |
| CN | 102550169 | 7/2012 | ............... A01C 7/00 |

(Continued)

OTHER PUBLICATIONS

International Search Report (w/translation) and Written Opinion (w/machine translation) issued in application No. PCT/CN2018/095530, dated Sep. 27, 2018 (11 pgs).

*Primary Examiner* — Jean Paul Cass
(74) *Attorney, Agent, or Firm* — Hayes Soloway P.C.

(57) ABSTRACT

A monitoring system and a monitoring method for a planter includes a computer having an unit speed fusion module, a seeding flow rate monitoring module, and a decision module for theoretical rotation speed of a drive motor, a rotation speed deviation inference module, a controlling parameter tuning module, an adjusting module for rotation speed of a seeding shaft, a controlling module for rotation speed of seeding shaft and a positioning signal receiver fixed on a top of a cab for receiving a geographic position signal. The system monitors operating state parameters of the planter and accurately controls seed amount.

6 Claims, 2 Drawing Sheets

(51) Int. Cl.
*H04W 4/029* (2018.01)
*G06F 16/901* (2019.01)
*A01B 79/00* (2006.01)
*G01S 19/14* (2010.01)
*G06K 9/62* (2022.01)
*G06N 3/08* (2006.01)
*G06F 17/11* (2006.01)

(52) U.S. Cl.
CPC ....... *G06F 16/9017* (2019.01); *G06K 9/6288* (2013.01); *G06N 3/08* (2013.01); *H02P 29/20* (2016.02); *H04W 4/029* (2018.02); *G06F 17/11* (2013.01)

(56) References Cited

U.S. PATENT DOCUMENTS

| | | | | |
|---|---|---|---|---|
| 7,703,266 B2* | 4/2010 | Fackler | ............... | A01D 41/145 701/50 |
| 7,725,234 B2* | 5/2010 | Shull | ............... | A01B 63/1117 701/50 |
| 7,769,512 B2* | 8/2010 | Norris | ............... | B62D 6/007 701/44 |
| 7,895,135 B2* | 2/2011 | Norris | ............... | F02D 41/1404 701/44 |
| 8,083,004 B2* | 12/2011 | Knight, Jr. | ............... | E02F 9/2029 172/699 |
| 8,195,364 B2* | 6/2012 | Norris | ............... | G05D 1/0278 701/19 |
| 8,359,139 B2* | 1/2013 | Wang | ............... | A01B 69/007 701/50 |
| 8,401,744 B2* | 3/2013 | Chiocco | ............... | G05D 1/0278 701/50 |
| 8,498,796 B2* | 7/2013 | Norris | ............... | G05D 1/0223 701/44 |
| 8,515,626 B2* | 8/2013 | Chiocco | ............... | E02F 9/205 701/41 |
| 8,726,543 B2* | 5/2014 | Kelly | ............... | E02F 3/847 701/50 |
| 9,706,696 B2* | 7/2017 | Gschwendtner | .... | F16H 61/4043 |
| 9,709,969 B2* | 7/2017 | Anderson | ............. | G05B 15/02 |
| 9,826,677 B2* | 11/2017 | Gervais | ............... | A01C 7/205 |
| 9,845,008 B2* | 12/2017 | Brownell | ............. | B60K 28/165 |
| 9,883,622 B2* | 2/2018 | Gschwendtner | ...... | A01B 63/102 |
| 9,994,104 B2* | 6/2018 | Hertel | ............... | E02F 3/84 |
| 10,112,615 B2* | 10/2018 | Hertel | ............... | B60W 30/02 |
| 10,407,072 B2* | 9/2019 | Hertel | ............... | E02F 9/2079 |
| 10,512,203 B2* | 12/2019 | Gschwendtner | ...... | E02F 9/2025 |
| 11,385,622 B2* | 7/2022 | Celia | ............... | G06N 3/0472 |
| 11,385,623 B2* | 7/2022 | Celia | ............... | G06N 5/046 |
| 2013/0124676 A1* | 5/2013 | Mochizuki | ....... | H04N 21/41415 709/217 |
| 2020/0245531 A1* | 8/2020 | Hu | ............... | H04W 4/02 |
| 2022/0108262 A1* | 4/2022 | Celia | ............... | G05B 19/41885 |

FOREIGN PATENT DOCUMENTS

| | | | | |
|---|---|---|---|---|
| CN | 102630407 | | 8/2012 | ............... A01C 7/00 |
| CN | 102754545 A | * | 10/2012 | ........... A01B 79/005 |
| CN | 106444507 | | 2/2017 | ............... A01C 7/06 |
| CN | 107733321 | | 2/2018 | ............... A01C 7/00 |
| CN | 108293715 A | * | 7/2018 | ........... A01C 21/005 |
| CN | 113418725 A | * | 9/2021 | |
| CN | 114303854 A | * | 4/2022 | |
| WO | WO-2008086318 A1 | * | 7/2008 | ........... A01B 79/005 |

* cited by examiner

MONITORING SYSTEM AND MONITORING METHOD FOR SEEDER

TECHNICAL FIELD

The present invention relates to the field of agricultural machinery automation, in particular to a monitoring system and a monitoring method for planter.

BACKGROUND ART

The intellectualization of seeding process has become a hot research topic in the field of agricultural engineering, and the self-adaptive monitoring system for planter has emerged at the right moment. Intelligent seeding is achieved by setting or importing a seeding prescription map. The traditional seeding machine whose seed-metering device is driven by means of chain transmission is susceptible to idling and slipping of the driving wheel in the wet and muddy soil environment, resulting in problems, such as reseeding or miss-seeding. In order to reduce the impact of the driving wheel slipping on the seeding quality during operation of the seeding machine, there is a new trend in the development of planter that electric traction system replaces the chain transmission system with land wheel as the power source. The Chinese patent No. CN201110398048.9 adopted a stepper motor to replace the land-wheel chain transmission system to drive the seed-metering device, which simplifies the mechanical structure. However, it still uses the rotation speed of the land wheel as a single factor to obtain the advance speed of the planter, and it does not eliminate the measurement deviation of the advance speed of the planter which is caused due to the idling or slipping of the land wheel, thus the planter still suffers from the miss-seeding or reseeding problem.

In order to speed up the intellectualization process of the planter, reduce the manual labor, realize informationalized seeding operation and provide data support for the subsequent field management and harvesting work, sensors should be installed at the key positions on a planter. In addition to feedbacking the advance speed of the planter, the sensor also needs to feedback spatial position of the planter, and the seed flow rate in unit distance in real time as important factors to adjust the rotational speed of the seed-metering device. Chinese Patent No. CN201210144176.5 provides an intelligent monitoring method for planter, which lacks a rotational speed monitoring means. As the adjustable-speed motor is controlled by the main control system directly, this method is susceptible to signal interference during operation and cannot eliminate the seeding amount deviation in time, thus causing the error between the actual seeding amount and the theoretical seeding amount.

At present, although the monitoring and control systems of planter are constantly innovating in the world, the actual rotation speed of the seeding shaft in practical application is still based on the adjustment algorithm with fixed parameter, and online optimization function of the control parameters is not involved at all.

CONTENTS OF THE INVENTION

In view of the drawbacks in the prior art, the present invention provides a monitoring system and a monitoring method for planter, which solves problems of monitoring the operating parameters of the planter and regulating the seeding amount precisely in real time.

The present invention realizes above technical objects by the following technical means.

A monitoring system for planter, characterized in that, it includes an industrial personal computer and a driving motor, the industrial personal computer includes a unit speed fusion module, a seeding flow rate monitoring module, a decision module for theoretical rotation speed of driving motor, a rotation speed deviation inference module, a controlling parameter tuning module, an adjusting module for rotation speed of seeding shaft and a controlling module for rotation speed of seeding shaft;

a positioning signal receiver is fixed on the top of a cab, and used to receive a geographic position signal, the positioning signal receiver is connected with the decision module for theoretical rotation speed of driving motor, the decision module for theoretical rotation speed of driving motor converts the geographic position signal into the theoretical seeding amount Q in the area by the looking-up table method, i.e. $Q=f(N_u, E_u)$, where $N_u$ is the north latitude coordinate of the planter and $E_u$ is the east longitude coordinate of the planter;

a speed sensor mounted on the driving wheel of the planter to measure the rotation speed of the driving wheel of the planter; the speed sensor is connected with the unit speed fusion module, and the driving wheel rotation speed n of the planter at the uth sampling is used as the input of the unit speed fusion module; an acceleration sensor is installed on the cross beam of the planter frame, to measure the acceleration of the planter; the acceleration sensor is connected with the unit speed fusion module, and the acceleration rotation speed $a_u$ of the planter at the uth sampling is used as the input of the unit speed fusion module;

the input driving wheel rotation speed $n_u$ and acceleration rotation speed $a_u$ of the planter at the uth sampling are converted into planter speed $v_u$ at the uth sampling by the unit speed fusion module through the speed fusion algorithm, specifically:

$$v_u = \begin{cases} \pi \cdot n_u \cdot D & \left| \frac{\pi \cdot D \cdot (n_u - n_{u-1})}{T} - a_u \right| \leq 2 \\ v_{u-1} + a_u \cdot T & 2 < \left| \frac{\pi \cdot D \cdot (n_u - n_{u-1})}{T} - a_u \right| \end{cases}$$

where $n_u$ is the driving wheel rotation speed of planter at the uth sampling, round/min;

$n_{u-1}$ is the driving wheel rotation speed of planter at the (u−1)th sampling, round/min; when u equals to 1, $n_0$ equals to 0;

D is the driving wheel diameter of the planter, m;

$a_u$ is the acceleration rotation speed of the planter at the uth sampling, m/s²;

$V_{u-1}$ is the speed of planter at (u−1)th sampling, m/s; when u equals to 1, $v_0$ equals to 0;

u is the current sampling number of times, $1 \leq u \leq m$, m is the total sampling number of times, and sampling period T is the time interval from (u−1)th sampling to uth sampling, and T is a constant;

a certain amount of flow rate sensors are installed on each seeding opening of planter for measuring the flow rate of each seeding opening; said a certain amount of flow rate sensors are connected with the seeding flow rate monitoring module and the flow rate on each seeding opening of planter is used as the input of the seeding flow rate monitoring module; the seeding flow rate monitoring module outputs the total seeding amount and is connected with the decision module for theoretical rotation speed of driving motor, so that the total seeding amount of the planter is used as the input of the decision module for theoretical rotation speed of driving motor;

the decision module for theoretical rotation speed of driving motor outputs the theoretical rotation speed $n_u^t$ of drive motor by the driving motor rotation speed algorithm through the input total seeding amount, the theoretical seeding amount Q in the area, and the speed $v_u$ of the planter at the uth sampling; i.e.:

$$n_u^t = \frac{60 \cdot \left(Q - \sum_{u=1}^{n} q_u\right) \cdot v_u \cdot A}{\left(666.7 - A \cdot \sum_{u=1}^{n} v_u\right) \cdot N \cdot q \cdot r}$$

where Q is the theoretical seeding amount in an area, kg;

$q_u$ is the total seeding amount at the uth sampling, kg;

$v_u$ is the speed of planter at the uth sampling, m/s;

A is the working width of planter, m;

q is the theoretical seeding amount per round of a single row of seeding shafts, kg;

N is the seeding rows of the planter, row;

r is transmission ratio between the seeding shaft driving motor and the seeding shaft;

u is the current sampling number of times, m is the total sampling number of times, 1≤u≤m, and sampling period T is the time interval from (u−1)th sampling to uth sampling, and T is a constant;

an encoder is installed on the driving motor to measure the actual driving motor rotation speed $n_u^r$; the encoder and the decision module for theoretical rotation speed of driving motor are respectively connected with the rotation speed deviation inference module, in which the rotation speed deviation $e_u$ is obtained by the actual rotation speed $n_u^r$ of the driving motor and the theoretical rotation speed $n_u^t$ of the seeding shaft via differential gate operation, i.e. $e_u = n_u^t - n_u^r$;

the controlling parameter tuning module is connected with the rotation speed deviation inference module, the rotation speed deviation $e_u$ is inputted to the controlling parameter tuning module; through the calculation of fuzzy neural network, the proportional coefficient $K_u^p$, the integral coefficient $K_u^i$ and the differential coefficient $K_u^d$ at the uth sampling are obtained, specifically:

$$K_u^p = \sum_{j=1}^{j} \sum_{k=1}^{k} \frac{\theta_{jk}^p \cdot e^{\left(-\frac{\delta_k'^2 \cdot (e_u^2 - m_j)^2 + \delta_j^2 \cdot (\Delta e_u^2 - m_k')^2}{\delta_j^2 \cdot \delta_k'^2}\right)}}{\sum_{j=1}^{j} \sum_{k=1}^{k} e^{\left(-\frac{\delta_k'^2 \cdot (e_u^2 - m_j)^2 + \delta_j^2 \cdot (\Delta e_u^2 - m_k')^2}{\delta_j^2 \cdot \delta_k'^2}\right)}}$$

$$K_u^i = \sum_{j=1}^{j} \sum_{k=1}^{k} \frac{\theta_{jk}^i \cdot e^{\left(-\frac{\delta_k'^2 \cdot (e_u^2 - m_j)^2 + \delta_j^2 \cdot (\Delta e_u^2 - m_k')^2}{\delta_j^2 \cdot \delta_k'^2}\right)}}{\sum_{j=1}^{j} \sum_{k=1}^{k} e^{\left(-\frac{\delta_k'^2 \cdot (e_u^2 - m_j)^2 + \delta_j^2 \cdot (\Delta e_u^2 - m_k')^2}{\delta_j^2 \cdot \delta_k'^2}\right)}}$$

-continued $$K_u^d = \sum_{j=1}^{j} \sum_{k=1}^{k} \frac{\theta_{jk}^d \cdot e^{\left(-\frac{\delta_k'^2 \cdot (e_u^2 - m_j)^2 + \delta_j^2 \cdot (\Delta e_u^2 - m_k')^2}{\delta_j^2 \cdot \delta_k'^2}\right)}}{\sum_{j=1}^{j} \sum_{k=1}^{k} e^{\left(-\frac{\delta_k'^2 \cdot (e_u^2 - m_j)^2 + \delta_j^2 \cdot (\Delta e_u^2 - m_k')^2}{\delta_j^2 \cdot \delta_k'^2}\right)}}$$

where $e_u$ is the rotation speed deviation at the uth sampling;

$\Delta e_u$ is the variable of the rotation speed deviations between two adjacent sampling periods, i.e., $\Delta e_u = e_u - e_{u-1}$ and $e_0$ is the initial value and $e_0$ equals to 0;

$m_j$ is the mean value of the jth fuzzy subset corresponding to the rotation speed deviation $e_u$, j is the number of fuzzy subsets corresponding to the rotation speed deviation $e_u$ and the optimal interval is {j∈N|5≤j≤11};

$m'_k$ is the mean value of the kth fuzzy subset corresponding to the variable of the rotation speed deviation $\Delta e_u$; k is the number of the fuzzy subsets corresponding to the variable of the rotation speed deviation $\Delta e_u$, and the optimal interval is {k∈N|5≤k≤11};

$\delta_j$ is the standard deviation of the jth fuzzy subset corresponding to rotation speed deviation $e_u$;

$\delta'_k$ is the standard deviation of kth fuzzy subset corresponding to rotation speed deviation variable $\Delta e_u$;

$\theta_{jk}^p$ is the corrected weight coefficient of the proportional parameter;

$\theta'_{jk}$ is the corrected weight coefficient of the integral parameter;

$\theta_{jk}^d$ is the corrected weight coefficient of the differential parameter;

the controlling parameter tuning module is connected with the adjusting module for rotation speed of seeding shaft, the proportional coefficient $K_u^p$, the integral coefficient $K_u^i$, the differential coefficient $K_u^d$, at the uth sampling are used as the input of the adjusting module for rotation speed of seeding shaft; the rotation speed deviation inference module is connected with the adjusting module for rotation speed of seeding shaft, and the rotation speed deviation $e_u$ is used as the input of the adjusting module for rotation speed of seeding shaft; the adjusting module for rotation speed of seeding shaft converts the input proportional coefficient $K_u^p$, the integral coefficient $K_u^i$, the differential coefficient $K_u^d$ and the rotation speed deviation $e_u$ at the uth sampling into the output of adjusting speed $n_u^a$ by the incremental PID algorithm, specifically:

$$n_u^a = \begin{cases} n_{u-1}^a + K_u^p\left(1 + \frac{T}{K_u^i} + \frac{K_u^d}{T}\right)e_u & u = 1 \\ n_{u-1}^a + K_u^p\left(1 + \frac{T}{K_u^i} + \frac{K_u^d}{T}\right)e_u + K_u^p\left(1 + \frac{2K_u^d}{T}\right)e_{u-1} & u = 2 \\ n_{u-1}^a + K_u^p\left(1 + \frac{T}{K_u^i} + \frac{K_u^d}{T}\right)e_u + K_u^p\left(1 + \frac{2K_u^d}{T}\right)e_{u-1} + & m > u > 2 \\ K_u^p \frac{K_u^d}{T} e_{u-2} & \end{cases}$$

the adjusting module for rotation speed of seeding shaft is connected with the controlling module for rotation speed of seeding shaft, through which the input adjusting rotation speed $n_u^a$ is converted into output of impulse frequency $P_u$; the driving motor controller is connected with the controlling module for rotation speed of seeding shaft to control the rotation speed of the driving motor by the pulse signal with the frequency of $P_u$.

Furthermore, the positioning signal receiver is a GPS positioner.

Furthermore, the transmission mode among the positioning signal receiver, the certain amount of flow rate sensors, the speed sensor, the acceleration sensor, the encoder and the industrial personal computer is wireless transmission.

Furthermore, the wireless transmission is the Zigbee wireless network transmission.

Furthermore, the sampling period T is 0.02 second.

A monitoring method of planter, characterized in that, it comprises the following steps:

S01: a decision module for theoretical rotation speed of driving motor converts the geographic position signal input by a positioning signal receiver at the uth sampling into the theoretical seeding amount Q of the area where the uth sampling is located by the looking-up table method, i.e. $Q=f(N_u, E_u)$, where $N_u$ is the north latitude coordinate of the planter at the uth sampling and $E_u$ is the east longitude coordinate of the planter at the uth sampling;

S02: an unit speed fusion module converts the input driving wheel rotation speed $n_u$ and the driving wheel acceleration rotation speed $a_u$ of the planter at the uth sampling into planter speed $v_u$ at the uth sampling by the speed fusion algorithm, specifically:

$$v_u = \begin{cases} \pi \cdot n_u \cdot D & \left|\frac{\pi \cdot D \cdot (n_u - n_{u-1})}{T} - a_u\right| \leq 2 \\ v_{u-1} + a_u \cdot T & 2 < \left|\frac{\pi \cdot D \cdot (n_u - n_{u-1})}{T} - a_u\right| \end{cases}$$

where $n_u$ is the driving wheel rotation speed of planter at the uth sampling, round/min;

$n_{u-1}$ is the driving wheel rotation speed of planter at the (u−1)th sampling, round/min; when u equals to 1, $n_0$ equals to 0;

D is the driving wheel diameter of the planter, m;

$a_u$ is the acceleration rotation speed of the planter at the uth sampling, m/s²;

$V_{u-1}$ is the speed of planter at (u−1)th sampling, m/s; when u equals to 1, $v_0$ equals to 0;

u is the current sampling number of times, 1≤u≤m, m is the total sampling number of times, and sampling period T is the time interval from (u−1)th sampling to uth sampling, and T is a constant;

S03: a certain amount of flow rate sensors are used to measure the flow rate of each seeding opening of the planter at the uth sampling; the flow rate is input to the seeding flow rate monitoring module and is converted to the total seeding amount $q_u$ at the uth sampling by the seeding flow rate monitoring module;

S04: the theoretical seeding amount Q in an area, the total seeding amount $q_u$ and the speed $v_u$ of the planter at the uth sampling are used as the input of the decision module for theoretical rotation speed of driving motor; the theoretical driving motor rotation speed $n_u^t$ is output by driving motor rotation speed algorithm as follows:

$$n_u^t = \frac{60 \cdot \left(Q - \sum_{u=1}^{n} q_u\right) \cdot v_u \cdot A}{\left(666.7 - A \cdot \sum_{u=1}^{n} v_u\right) \cdot N \cdot q \cdot r}$$

where Q is the theoretical seeding amount in an area, kg;

$q_u$ is the total seeding amount at the uth sampling, kg;

$v_u$ is the speed of planter at the uth sampling, m/s;

A is the working width of planter, m;

q is the theoretical seeding amount per round of a single row of seeding shafts, kg;

N is the seeding rows of the planter, row;

r is transmission ratio between the seeding shaft driving motor and the seeding shaft;

u is the current sampling number of times, m is the total sampling number of times, 1≤u≤m, and sampling period T is the time interval from (u−1)th sampling to uth sampling, and T is a constant;

S05: the rotation speed deviation $e_u$ is obtained via the differential gate operation by inputting the driving motor theoretical rotation speed $n_u^t$ the actual speed $n_u^r$ fedback by the encoder into the rotation speed deviation inference module, i.e. $e_u = n_u^t - n_u^r$;

S06: the rotation speed deviation $e_u$ is input to the controlling parameter tuning module; through the calculation of fuzzy neural network, the proportional coefficient $K_u^a$, the integral coefficient $K_u^i$ and the differential coefficient $K_u^d$ at the uth sampling are obtained as follows:

$$K_u^p = \sum_{j=1}^{j}\sum_{k=1}^{k} \frac{\theta_{jk}^p \cdot e^{\left(-\frac{\delta_k'^2 \cdot (e_u^2 - m_j)^2 + \delta_j^2 \cdot (\Delta e_u^2 - m_k')^2}{\delta_j^2 \cdot \delta_k'^2}\right)}}{\sum_{j=1}^{j}\sum_{k=1}^{k} e^{\left(-\frac{\delta_k'^2 \cdot (e_u^2 - m_j)^2 + \delta_j^2 \cdot (\Delta e_u^2 - m_k')^2}{\delta_j^2 \cdot \delta_k'^2}\right)}}$$

$$K_u^i = \sum_{j=1}^{j}\sum_{k=1}^{k} \frac{\theta_{jk}^i \cdot e^{\left(-\frac{\delta_k'^2 \cdot (e_u^2 - m_j)^2 + \delta_j^2 \cdot (\Delta e_u^2 - m_k')^2}{\delta_j^2 \cdot \delta_k'^2}\right)}}{\sum_{j=1}^{j}\sum_{k=1}^{k} e^{\left(-\frac{\delta_k'^2 \cdot (e_u^2 - m_j)^2 + \delta_j^2 \cdot (\Delta e_u^2 - m_k')^2}{\delta_j^2 \cdot \delta_k'^2}\right)}}$$

$$K_u^d = \sum_{j=1}^{j}\sum_{k=1}^{k} \frac{\theta_{jk}^d \cdot e^{\left(-\frac{\delta_k'^2 \cdot (e_u^2 - m_j)^2 + \delta_j^2 \cdot (\Delta e_u^2 - m_k')^2}{\delta_j^2 \cdot \delta_k'^2}\right)}}{\sum_{j=1}^{j}\sum_{k=1}^{k} e^{\left(-\frac{\delta_k'^2 \cdot (e_u^2 - m_j)^2 + \delta_j^2 \cdot (\Delta e_u^2 - m_k')^2}{\delta_j^2 \cdot \delta_k'^2}\right)}}$$

where $e_u$ is the rotation speed deviation at the uth sampling;

$\Delta e_u$ is the variable of the rotation speed deviations between two adjacent sampling periods, i.e., $\Delta e_u = e_u - e_{u-1}$ and $e_0$ is the initial value and $e_0$ equals to 0;

$m_j$ is the mean value of the jth fuzzy subset corresponding to the rotation speed deviation $e_u$, j is the number of fuzzy subsets corresponding to the rotation speed deviation $e_u$ and the optimal interval is $\{j \in N | 5 \leq j \leq 11\}$;

$m'_k$ is the mean value of the kth fuzzy subset corresponding to the variable of the rotation speed deviation $\Delta e$; k is the number of the fuzzy subsets corresponding to the variable of the rotation speed deviation $\Delta e_u$, and the optimal interval is $\{k \in N | 5 \leq k \leq 11\}$;

$\delta_j$ is the standard deviation of the jth fuzzy subset corresponding to rotation speed deviation $e_u$;

$\delta'_k$ is the standard deviation of kth fuzzy subset corresponding to rotation speed deviation variable $\Delta e_u$;

$\theta_{jk}^p$ is the corrected weight coefficient of the proportional parameter;

$\theta_{jk}^i$ is the corrected weight coefficient of the integral parameter;

$\theta_{jk}^d$ is the corrected weight coefficient of the differential parameter;

S07: the proportional coefficient $K_u^p$, the integral coefficient $K_u^i$, the differential coefficient $K_u^d$ and the rotation speed deviation e at the uth sampling are input to the adjusting module for rotation speed of seeding shaft and converted into the output of adjusting rotation speed $n_u^a$ by the incremental PID algorithm, specifically:

$$n_u^a = \begin{cases} n_{u-1}^a + K_u^p\left(1 + \dfrac{T}{K_u^i} + \dfrac{K_u^d}{T}\right)e_u & u = 1 \\ n_{u-1}^a + K_u^p\left(1 + \dfrac{T}{K_u^i} + \dfrac{K_u^d}{T}\right)e_u + K_u^p\left(1 + \dfrac{2K_u^d}{T}\right)e_{u-1} & u = 2 \\ n_{u-1}^a + K_u^p\left(1 + \dfrac{T}{K_u^i} + \dfrac{K_u^d}{T}\right)e_u + K_u^p\left(1 + \dfrac{2K_u^d}{T}\right)e_{u-1} + & m > u > 2 \\ K_u^p \dfrac{K_u^d}{T} e_{u-2} \end{cases}$$

S08: the input adjusting rotation speed $n_u^a$ is converted into output of impulse frequency $P_u$ by the controlling module for rotation speed of seeding shaft; the driving motor controller controls the rotation speed of the driving motor by the pulse signal with the frequency of $P_u$; the encoder outputs the feedback of actual rotation speed $n_u^r$ to the rotation speed deviation inference module;

S09: if u<m, the (u+1)th sampling period is started, the mentioned steps S01 to S08 are executed circularly; if u=m or the industrial personal computer receives a stop command, the planter would stop the seeding operation.

The beneficial effects of the invention are as follows:

1. The monitoring system and the monitoring method of the planter in the present invention can realize online optimization by using a fuzzy neural network algorithm by setting the control parameter tuning module, to strengthen the adaptability of PID algorithm in the variable seeding application, and reduce the adjusting time and the overshoot between the actual speed and the theoretical speed of the seeding shaft driving motor.

2. The monitoring system and the monitoring method of the planter in the present invention eliminate the speed measurement error caused by a single sensor by using the speed fusion algorithm by setting the unit speed fusion module, and obtain the optimal value of the unit advance speed.

3. The monitoring system and the monitoring method of the planter in the present invention can realize information communication by replacing the existing CAN bus with the Zigbee wireless communication technology, to solve the problem that the connection between the vehicle terminal and each terminal module is complicated which results in mutual interference, improve the monitoring accuracy of the planter operational parameters effectively, and reduce power consumption effectively which can make the storage battery have a longer life.

Where 1—industrial personal computer, 1—unit speed fusion module, 12—seeding flow rate monitoring module, 13—decision module for theoretical rotation speed of driving motor, 14—rotation speed deviation inference module, 15—controlling parameter tuning module, 16—adjusting module for rotation speed of seeding shaft, 17—controlling module for rotation speed of seeding shaft, 2—driving motor controller, 3—driving motor, 4—encoder.

EMBODIMENTS

The present invention will be further described below with reference to the drawings and examples, but the scope of protection of the present invention is not limited thereto.

Figure 1:
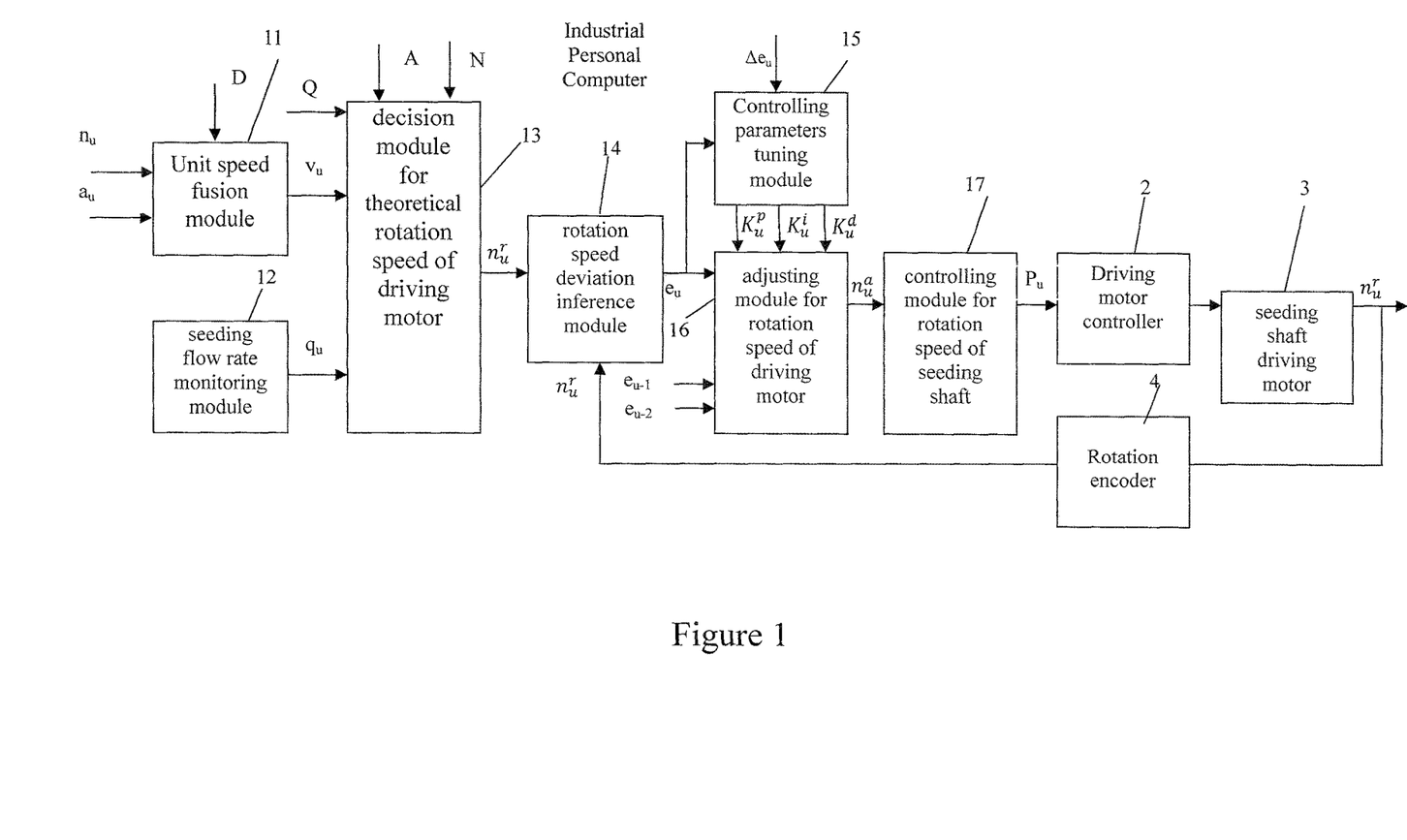
FIG. 1 is a control diagram of the planter monitoring system according to the present invention.

As shown in the FIG. 1, a monitoring system for planter includes an industrial personal computer 1 and a driving motor 3, the industrial personal computer 1 includes a unit speed fusion module 11, a seeding flow rate monitoring module 12, a decision module 13 for theoretical rotation speed of driving motor, a rotation speed deviation inference module 14, a controlling parameter tuning module 15, an adjusting module 16 for rotation speed of seeding shaft and a controlling module 17 for rotation speed of seeding shaft;

a positioning signal receiver is fixed on the top of a cab, and used to receive a geographic position signal, the positioning signal receiver is connected with the decision module 13 for theoretical rotation speed of driving motor, the decision module 13 for theoretical rotation speed of driving motor converts the geographic position signal into the theoretical seeding amount Q in the area by the looking-up table method, i.e. $Q=f(N_u, E_u)$, where $N_u$ is the north latitude coordinate of the planter and $E_u$ is the east longitude coordinate of the planter; the positioning signal receiver is a GPS positioner;

a speed sensor mounted on the driving wheel of the planter to measure the rotation speed of the driving wheel of the planter; the speed sensor is connected with the unit speed fusion module 11, and the driving wheel rotation speed $n_u$ of the planter at the uth sampling is used as the input of the unit speed fusion module 11; an acceleration sensor is installed on the cross beam of the planter frame, to measure the acceleration of the planter; the acceleration sensor is connected with the unit speed fusion module 11, and the acceleration rotation speed $a_u$ of the planter at the uth sampling is used as the input of the unit speed fusion module 11;

the input driving wheel rotation speed $n_u$ and acceleration rotation speed $a_u$ of the planter at the uth sampling are converted into planter speed $v_u$ at the uth sampling by the unit speed fusion module 11 through the speed fusion algorithm, specifically:

$$v_u = \begin{cases} \pi \cdot n_u \cdot D & \left|\dfrac{\pi \cdot D \cdot (n_u - n_{u-1})}{T} - a_u\right| \leq 2 \\ v_{u-1} + a_u \cdot T & 2 < \left|\dfrac{\pi \cdot D \cdot (n_u - n_{u-1})}{T} - a_u\right| \end{cases}$$

where $n_u$ is the driving wheel rotation speed of planter at the uth sampling, round/min;

$n_{u-1}$ is the driving wheel rotation speed of planter at the (u−1)th sampling, round/min; when u equals to 1, $n_0$ equals to 0;

D is the driving wheel diameter of the planter, m;

$a_u$ is the acceleration rotation speed of the planter at the uth sampling, m/s²;

$V_{u-1}$ is the speed of planter at (u−1)th sampling, m/s; when u equals to 1, $v_0$ equals to 0;

u is the current sampling number of times, 1≤u≤m, m is the total sampling number of times, and sampling period T is the time interval from (u−1)th sampling to uth sampling, and T is a constant;

a certain amount of flow rate sensors are installed on each seeding opening of planter for measuring the flow rate of each seeding opening; said a certain amount of flow rate sensors are connected with the seeding flow rate monitoring module 12 and the flow rate on each seeding opening of planter is used as the input of the seeding flow rate monitoring module 12; the seeding flow rate monitoring module 12 outputs the total seeding amount and is connected with the decision module 13 for theoretical rotation speed of driving motor, so that the total seeding amount of the planter is used as the input of the decision module 13 for theoretical rotation speed of driving motor;

the decision module 13 for theoretical rotation speed of driving motor outputs the theoretical rotation speed $n_u^t$ of drive motor by the driving motor rotation speed algorithm through the input total seeding amount, the theoretical seeding amount Q in the area, and the speed $v_u$ of the planter at the uth sampling; i.e.:

$$n_u^t = \frac{60 \cdot \left(Q - \sum_{u=1}^{n} q_u\right) \cdot v_u \cdot A}{\left(666.7 - A \cdot \sum_{u=1}^{n} v_u\right) \cdot N \cdot q \cdot r}$$

where Q is the theoretical seeding amount in an area, kg;

$q_u$ is the total seeding amount at the uth sampling, kg;

$v_u$ is the speed of planter at the uth sampling, m/s;

A is the working width of planter, m;

q is the theoretical seeding amount per round of a single row of seeding shafts, kg;

N is the seeding rows of the planter, row;

r is transmission ratio between the seeding shaft driving motor and the seeding shaft;

u is the current sampling number of times, m is the total sampling number of times, 1≤u≤m, and sampling period T is the time interval from (u−1)th sampling to uth sampling, and T is a constant;

an encoder 4 is installed on the driving motor 3 to measure the actual driving motor rotation speed $n_u^r$; the encoder 4 and the decision module 13 for theoretical rotation speed of driving motor are respectively connected with the rotation speed deviation inference module 14, in which the rotation speed deviation $e_u$ is obtained by the actual rotation speed $n_u^r$ of the driving motor 3 and the theoretical rotation speed $n_u^t$ of the seeding shaft via differential gate operation, i.e. $e_u = n_u^t - n_u^r$;

the controlling parameter tuning module 15 is connected with the rotation speed deviation inference module 14, the rotation speed deviation $e_u$ is inputted to the controlling parameter tuning module 15; through the calculation of fuzzy neural network, the proportional coefficient $K_u^p$, the integral coefficient $K_u^i$ and the differential coefficient $K_u^d$ at the uth sampling are obtained, specifically:

$$K_u^p = \sum_{j=1}^{j}\sum_{k=1}^{k} \frac{\theta_{jk}^p \cdot e^{\left(-\frac{\delta_k'^2 \cdot (e_u^2 - m_j)^2 + \delta_j^2 \cdot (\Delta e_u^2 - m_k')^2}{\delta_j^2 \cdot \delta_k'^2}\right)}}{\sum_{j=1}^{j}\sum_{k=1}^{k} e^{\left(-\frac{\delta_k'^2 \cdot (e_u^2 - m_j)^2 + \delta_j^2 \cdot (\Delta e_u^2 - m_k')^2}{\delta_j^2 \cdot \delta_k'^2}\right)}}$$

$$K_u^i = \sum_{j=1}^{j}\sum_{k=1}^{k} \frac{\theta_{jk}^i \cdot e^{\left(-\frac{\delta_k'^2 \cdot (e_u^2 - m_j)^2 + \delta_j^2 \cdot (\Delta e_u^2 - m_k')^2}{\delta_j^2 \cdot \delta_k'^2}\right)}}{\sum_{j=1}^{j}\sum_{k=1}^{k} e^{\left(-\frac{\delta_k'^2 \cdot (e_u^2 - m_j)^2 + \delta_j^2 \cdot (\Delta e_u^2 - m_k')^2}{\delta_j^2 \cdot \delta_k'^2}\right)}}$$

$$K_u^d = \sum_{j=1}^{j}\sum_{k=1}^{k} \frac{\theta_{jk}^d \cdot e^{\left(-\frac{\delta_k'^2 \cdot (e_u^2 - m_j)^2 + \delta_j^2 \cdot (\Delta e_u^2 - m_k')^2}{\delta_j^2 \cdot \delta_k'^2}\right)}}{\sum_{j=1}^{j}\sum_{k=1}^{k} e^{\left(-\frac{\delta_k'^2 \cdot (e_u^2 - m_j)^2 + \delta_j^2 \cdot (\Delta e_u^2 - m_k')^2}{\delta_j^2 \cdot \delta_k'^2}\right)}}$$

where $e_u$ is the rotation speed deviation at the uth sampling;

$\Delta e_u$ is the variable of the rotation speed deviations between two adjacent sampling periods, i.e., $\Delta e_u = e_u - e_{u-1}$ and $e_0$ is the initial value and $e_0$ equals to 0;

$m_j$ is the mean value of the jth fuzzy subset corresponding to the rotation speed deviation $e_u$, j is the number of fuzzy subsets corresponding to the rotation speed deviation $e_u$ and the optimal interval is {j∈N|5≤j≤11};

$m'_k$ is the mean value of the kth fuzzy subset corresponding to the variable of the rotation speed deviation $\Delta e_u$; k is the number of the fuzzy subsets corresponding to the variable of the rotation speed deviation $\Delta e_u$, and the optimal interval is {k ∈ N|5≤k≤11};

$\delta_j$ is the standard deviation of the jth fuzzy subset corresponding to rotation speed deviation $e_u$;

$\delta'_k$ is the standard deviation of kth fuzzy subset corresponding to rotation speed deviation variable $\Delta e_u$;

$\theta_{jk}^p$ is the corrected weight coefficient of the proportional parameter;

$\theta_{jk}^i$ is the corrected weight coefficient of the integral parameter;

$\theta_{jk}^d$ is the corrected weight coefficient of the differential parameter;

the controlling parameter tuning module 15 is connected with the adjusting module 16 for rotation speed of seeding shaft, the proportional coefficient $K_u^p$, the integral coefficient $K_u^i$, the differential coefficient $K_u^d$, at the uth sampling are used as the input of the adjusting module 16 for rotation speed of seeding shaft; the rotation speed deviation inference module 14 is connected with the adjusting module 16 for rotation speed of seeding shaft, and the rotation speed deviation $e_u$ is used as the input of the adjusting module 16 for rotation speed of seeding shaft; the adjusting module 16 for rotation speed of seeding shaft converts the input proportional coefficient $K_u^p$, the integral coefficient $K_u^i$, the differential coefficient $K_u^d$ and the rotation speed deviation $e_u$ at the uth sampling into the output of adjusting speed $n_u^a$ by the incremental PID algorithm, specifically:

$$n_u^a = \begin{cases} n_{u-1}^a + K_u^p\left(1 + \frac{T}{K_u^i} + \frac{K_u^d}{T}\right)e_u & u = 1 \\ n_{u-1}^a + K_u^p\left(1 + \frac{T}{K_u^i} + \frac{K_u^d}{T}\right)e_u + K_u^p\left(1 + \frac{2K_u^d}{T}\right)e_{u-1} & u = 2 \\ n_{u-1}^a + K_u^p\left(1 + \frac{T}{K_u^i} + \frac{K_u^d}{T}\right)e_u + K_u^p\left(1 + \frac{2K_u^d}{T}\right)e_{u-1} + & m > u > 2 \\ K_u^p \frac{K_u^d}{T} e_{u-2} & \end{cases}$$

the adjusting module 16 for rotation speed of seeding shaft is connected with the controlling module 17 for rotation speed of seeding shaft, through which the input adjusting rotation speed $n_u^a$ is converted into output of impulse frequency $P_u$; the formula is as following:

$$P_u = \frac{360 \cdot d \cdot n_u^a}{ag},$$

where $n_u^a$ is the adjusting rotation speed of the seeding shaft driving motor, round/min; ag is the stepping angle of the seeding shaft driving motor, degree; d is the subdivision number of the seeding shaft driving motor; the driving motor controller 2 is connected with the controlling module 17 for rotation speed of seeding shaft to control the rotation speed of the driving motor 3 by the pulse signal with the frequency of $P_u$.

The transmission mode among the positioning signal receiver, the certain amount of flow rate sensors, the speed sensor, the acceleration sensor, the encoder 4 and the industrial personal computer 1 is wireless transmission. The wireless transmission is the Zigbee wireless network transmission.

The sampling period T is 0.02 second.

The industrial personal computer 1 is equipped with a user software program, which can perform human-machine interaction, including an unit parameters setting interface and an unit state monitoring interface. The unit parameters setting interface is used to set a working zone, selection of seeding area, a tractor front wheel diameter and whether or not to open alarm for seed box margin and abnormal seeding amount. The unit state monitoring interface is used to update the current geographic position information of the planter, the advance speed of the planter, the seed box margin, the sustainable working time of the residual seeds and seeding amount of each seeding group. The industrial personal computer is further provided with an indicator light for border-crossing alarm of working zone, abnormal seeding amount alarm and insufficient seed storage alarm.

Figure 2:
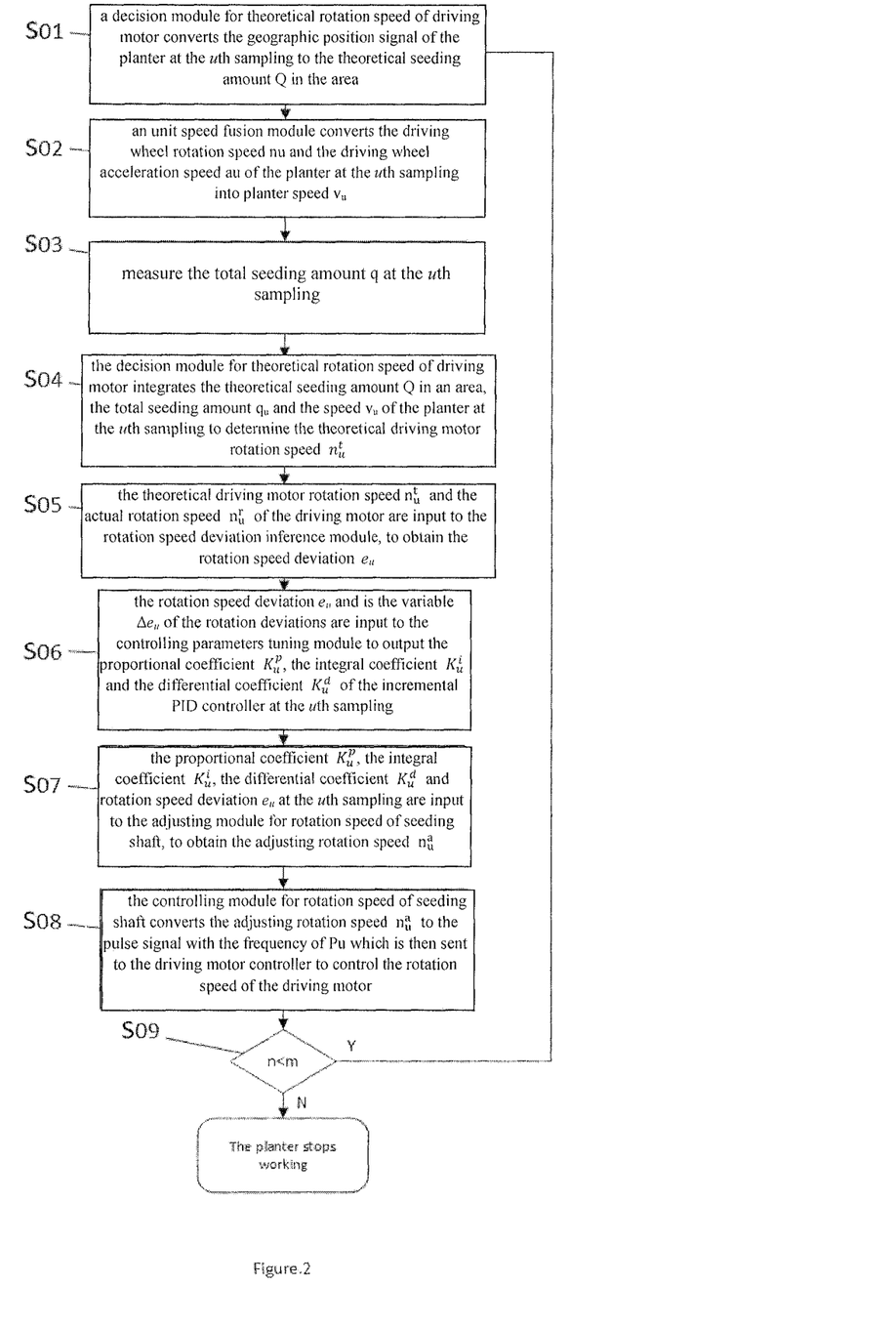
FIG. 2 is a flow diagram of a planter monitoring method according to the present invention.

As is shown in FIG. 2, a monitoring method of planter according to the present invention comprises the following steps:

S01: a decision module 13 for theoretical rotation speed of driving motor converts the geographic position signal input by a positioning signal receiver at the uth sampling into the theoretical seeding amount Q of the area where the uth sampling is located by the looking-up table method, i.e. $Q=f(N_u, E_u)$, where $N_u$ is the north latitude coordinate of the planter at the uth sampling and $E_u$ is the east longitude coordinate of the planter at the uth sampling;

S02: an unit speed fusion module 11 converts the input driving wheel rotation speed $n_u$ and the driving wheel acceleration rotation speed $a_u$ of the planter at the uth sampling into planter speed $v_u$ at the uth sampling by the speed fusion algorithm, specifically:

$$v_u = \begin{cases} \pi \cdot n_u \cdot D & \left|\frac{\pi \cdot D \cdot (n_u - n_{u-1})}{T} - a_u\right| \leq 2 \\ v_{u-1} + a_u \cdot T & 2 < \left|\frac{\pi \cdot D \cdot (n_u - n_{u-1})}{T} - a_u\right| \end{cases}$$

where $n_u$ is the driving wheel rotation speed of planter at the uth sampling, round/min;

$n_{u-1}$ is the driving wheel rotation speed of planter at the (u−1)th sampling, round/min; when u equals to 1, $n_0$ equals to 0;

D is the driving wheel diameter of the planter, m;

$a_u$ is the acceleration rotation speed of the planter at the uth sampling, m/s$^2$;

$V_{u-1}$ is the speed of planter at (u−1)th sampling, m/s; when u equals to 1, $v_0$ equals to 0;

u is the current sampling number of times, 1≤u≤m, m is the total sampling number of times, and sampling period T is the time interval from (u−1)th sampling to uth sampling, and T is a constant;

S03: a certain amount of flow rate sensors are used to measure the flow rate of each seeding opening of the planter at the uth sampling; the flow rate is input to the seeding flow rate monitoring module 12 and is converted to the total seeding amount $q_u$ at the uth sampling by the seeding flow rate monitoring module 12;

S04: the theoretical seeding amount Q in an area, the total seeding amount $q_u$ and the speed $v_u$ of the planter at the uth sampling are used as the input of the decision module 13 for theoretical rotation speed of driving motor; the theoretical driving motor rotation speed $n_u^t$ is output by driving motor rotation speed algorithm as follows:

$$n_u^t = \frac{60 \cdot \left(Q - \sum_{u=1}^{n} q_u\right) \cdot v_u \cdot A}{\left(666.7 - A \cdot \sum_{u=1}^{n} v_u\right) \cdot N \cdot q \cdot r}$$

where Q is the theoretical seeding amount in an area, kg;

$q_u$ is the total seeding amount at the uth sampling, kg;

$v_u$ is the speed of planter at the uth sampling, m/s;

A is the working width of planter, m;

q is the theoretical seeding amount per round of a single row of seeding shafts, kg;

N is the seeding rows of the planter, row;

r is transmission ratio between the seeding shaft driving motor and the seeding shaft;

u is the current sampling number of times, m is the total sampling number of times, 1≤u≤m, and sampling period T is the time interval from (u−1)th sampling to uth sampling, and T is a constant;

S05: the rotation speed deviation $e_u$ is obtained via the differential gate operation by inputting the driving motor theoretical rotation speed $n_u^t$ the actual speed $n_u^r$ fedback by the encoder 4 into the rotation speed deviation inference module 14, i.e. $e_u = n_u^t - n_u^r$;

S06: the rotation speed deviation $e_u$ is input to the controlling parameter tuning module 15; through the calculation of fuzzy neural network, the proportional coefficient $K_u^p$, the integral coefficient $K_u^i$ and the differential coefficient $K_u^d$ at the uth sampling are obtained as follows:

$$K_u^p = \sum_{j=1}^{j}\sum_{k=1}^{k} \theta_{jk}^p \cdot \frac{e^{\left(-\frac{\delta_k'^2 \cdot (e_u^2-m_j)^2+\delta_j'^2 \cdot (\Delta e_u^2-m_k')^2}{\delta_j^2 \cdot \delta_k'^2}\right)}}{\sum_{j=1}^{j}\sum_{k=1}^{k} e^{\left(-\frac{\delta_k'^2 \cdot (e_u^2-m_j)^2+\delta_j'^2 \cdot (\Delta e_u^2-m_k')^2}{\delta_j^2 \cdot \delta_k'^2}\right)}}$$

$$K_u^i = \sum_{j=1}^{j}\sum_{k=1}^{k} \theta_{jk}^i \cdot \frac{e^{\left(-\frac{\delta_k'^2 \cdot (e_u^2-m_j)^2+\delta_j'^2 \cdot (\Delta e_u^2-m_k')^2}{\delta_j^2 \cdot \delta_k'^2}\right)}}{\sum_{j=1}^{j}\sum_{k=1}^{k} e^{\left(-\frac{\delta_k'^2 \cdot (e_u^2-m_j)^2+\delta_j'^2 \cdot (\Delta e_u^2-m_k')^2}{\delta_j^2 \cdot \delta_k'^2}\right)}}$$

$$K_u^d = \sum_{j=1}^{j}\sum_{k=1}^{k} \theta_{jk}^d \cdot \frac{e^{\left(-\frac{\delta_k'^2 \cdot (e_u^2-m_j)^2+\delta_j'^2 \cdot (\Delta e_u^2-m_k')^2}{\delta_j^2 \cdot \delta_k'^2}\right)}}{\sum_{j=1}^{j}\sum_{k=1}^{k} e^{\left(-\frac{\delta_k'^2 \cdot (e_u^2-m_j)^2+\delta_j'^2 \cdot (\Delta e_u^2-m_k')^2}{\delta_j^2 \cdot \delta_k'^2}\right)}}$$

where $e_u$ is the rotation speed deviation at the uth sampling;

$\Delta e_u$ is the variable of the rotation speed deviations between two adjacent sampling periods, i.e., $\Delta e_u = e_u - e_{u-1}$ and $e_0$ is the initial value and $e_0$ equals to 0;

$m_j$ is the mean value of the jth fuzzy subset corresponding to the rotation speed deviation $e_u$, j is the number of fuzzy subsets corresponding to the rotation speed deviation $e_u$ and the optimal interval is $\{j \in N | 5 \leq j \leq 11\}$;

$m'_k$ is the mean value of the kth fuzzy subset corresponding to the variable of the rotation speed deviation $\Delta e_u$; k is the number of the fuzzy subsets corresponding to the variable of the rotation speed deviation $\Delta e_u$, and the optimal interval is $\{k \in N | 5 \leq k \leq 11\}$;

$\delta_j$ is the standard deviation of the jth fuzzy subset corresponding to rotation speed deviation $e_u$;

$\delta'_k$ is the standard deviation of kth fuzzy subset corresponding to rotation speed deviation variable $\Delta e_u$;

$\theta_{jk}^p$ is the corrected weight coefficient of the proportional parameter;

$\theta_{jk}^i$ is the corrected weight coefficient of the integral parameter;

$\theta_{jk}^d$ is the corrected weight coefficient of the differential parameter;

S07: the proportional coefficient $K_u^p$, the integral coefficient $K_u^i$, the differential coefficient $K_u^d$ and the rotation speed deviation $e_u$ at the uth sampling are input to the adjusting module 16 for rotation speed of seeding shaft and converted into the output of adjusting rotation speed $n_u^a$ by the incremental PID algorithm, specifically:

$$n_u^a = \begin{cases} n_{u-1}^a + K_u^p\left(1+\frac{T}{K_u^i}+\frac{K_u^d}{T}\right)e_u & u=1 \\ n_{u-1}^a + K_u^p\left(1+\frac{T}{K_u^i}+\frac{K_u^d}{T}\right)e_u + K_u^p\left(1+\frac{2K_u^d}{T}\right)e_{u-1} & u=2 \\ n_{u-1}^a + K_u^p\left(1+\frac{T}{K_u^i}+\frac{K_u^d}{T}\right)e_u + K_u^p\left(1+\frac{2K_u^d}{T}\right)e_{u-1}+ & m>u>2 \\ K_u^p\frac{K_u^d}{T}e_{u-2} & \end{cases}$$

S08: the input adjusting rotation speed $n_u^a$ is converted into output of impulse frequency $P_u$ by the controlling module 17 for rotation speed of seeding shaft; the driving motor controller 2 controls the rotation speed of the driving motor 3 by the pulse signal with the frequency of $P_u$; the encoder 4 outputs the feedback of actual rotational speed $n_u^r$ to the rotation speed deviation inference module 14;

S09: if u<m, the (u+1)th sampling period is started, the mentioned steps S01 to S08 are executed circularly; if u=m or the industrial personal computer receives a stop command, the planter would stop the seeding operation.

The embodiments are preferred embodiments of the invention, but the invention is not limited to the embodiments described above. Any obvious improvement, modification or alternative that can be made by the person skilled in the art without departing from the substantive content of the invention are deemed as falling in the protection scope of the invention.

The invention claimed is:

1. A monitoring system for a planter, said system comprising a computer, a drive motor, a unit speed fusion module, a seeding flow rate monitoring module, a decision module for theoretical rotation speed of the drive motor, a rotation speed deviation inference module, a control parameter tuning module, an adjusting module for adjusting rotation speed of seeding shaft, and a control module for controlling rotation speed of seeding shaft;

a positioning signal receiver fixed on a top of a cab, and configured to receive a geographic position signal, the positioning signal receiver being connected with the decision module for theoretical rotation speed of the drive motor, the decision module for theoretical rotation speed of drive motor being configured to convert the geographic position signal into a theoretical seeding amount Q in the area by a look-up table method according to $Q=f(N_u,E_u)$, where $N_u$ is a north latitude coordinate of the planter and $E_u$ is an east longitude coordinate of the planter;

a speed sensor mounted on a drive wheel of the planter to measure the rotation speed of the drive wheel of the planter; the speed sensor being connected with the unit speed fusion module, and the drive wheel rotation speed $n_u$ of the planter at the uth sampling being used as an input of the unit speed fusion module;

an acceleration sensor installed on a cross beam of the planter frame, configured to measure acceleration of the planter; the acceleration sensor being connected with a unit speed fusion module, and the acceleration rotation speed $a_u$ of the planter at the uth sampling being used as an input of the unit speed fusion module;

the input drive wheel rotation speed $n_u$ and acceleration rotation speed $a_u$ of the planter at the uth sampling being converted into planter speed $v_u$ at the uth sampling by the unit speed fusion module through a speed fusion algorithm, wherein:

$$v_u = \begin{cases} \pi \cdot n_u \cdot D & \left|\frac{\pi \cdot D \cdot (n_u-n_{u-1})}{T}-a_u\right| \leq 2 \\ v_{u-1}+a_u \cdot T & 2 < \left|\frac{\pi \cdot D \cdot (n_u-n_{u-1})}{T}-a_u\right| \end{cases}$$

where $n_u$ is the drive wheel rotation speed of planter at the uth sampling, round/min;

$n_{u-1}$ is the drive wheel rotation speed of planter at the (u−1)th sampling, round/min; when u equals to 1, $n_0$ equals to 0;

D is the drive wheel diameter of the planter, m;

$a_u$ is the acceleration rotation speed of the planter at the uth sampling, m/s$^2$;

$V_{u-1}$ is the speed of planter at (u−1)th sampling, m/s; when u equals to 1, $v_0$ equals to 0;

u is the current sampling number of times, 1≤u≤m, m is the total sampling number of times, and sampling period T is the time interval from (u−1)th sampling to uth sampling, and T is a constant;

wherein flow rate sensors are installed on each seeding opening of planter for measuring the flow rate of each seeding opening; said flow rate sensors being connected with the seeding flow rate monitoring module and the flow rate on each seeding opening of planter being used as an input of the seeding flow rate monitoring module; wherein the seeding flow rate monitoring module outputs the total seeding amount and is connected with a decision module for theoretical rotation speed of drive motor, so that a total seeding amount of the planter is used as the input of the decision module for theoretical rotation speed of drive motor;

wherein the decision module for theoretical rotation speed of drive motor outputs the theoretical rotation speed $n_u^t$ of drive motor by the drive motor rotation speed algorithm through the input total seeding amount, the theoretical seeding amount Q in the area, and the speed $v_u$ of the planter at the uth sampling; wherein:

$$n_u^t = \frac{60 \cdot \left(Q - \sum_{u=1}^n q_u\right) \cdot v_u \cdot A}{\left(666.7 - A \cdot \sum_{u=1}^n v_u\right) \cdot N \cdot q \cdot r}$$

where Q is the theoretical seeding amount in an area, kg;

$q_u$ is a total seeding amount at the uth sampling, kg;

$v_u$ is a speed of planter at the uth sampling, m/s;

A is a working width of planter, m;

q is a theoretical seeding amount per round of a single row of seeding shafts, kg;

N is the number of seeding rows of the planter;

r is a transmission ratio between the seeding shaft drive motor and the seeding shaft;

wherein an encoder is installed on the drive motor to measure the actual drive motor rotation speed $n_u^r$; the encoder and the decision module for theoretical rotation speed of drive motor are respectively connected with the rotation speed deviation inference module, in which the rotation speed deviation $e_u$ is obtained by the actual rotation speed $n_u^r$ of the drive motor and the theoretical rotation speed $n_u^t$ of the seeding shaft via differential gate operation, $e_u = n_u^t - n_u^r$;

wherein the controlling parameter tuning module is connected with a rotation speed deviation inference module, the rotation speed deviation $e_u$ is inputted to the controlling parameter tuning module; through the calculation of fuzzy neural network, a proportional coefficient $K_u^p$, integral coefficient $K_u^i$ and a differential coefficient $K_u^d$ the uth sampling are obtained, wherein:

$$K_u^p = \sum_{j=1}^{j}\sum_{k=1}^{k} \frac{\theta_{jk}^p \cdot e^{\left(-\frac{\delta_k'^2 \cdot (e_u^2 - m_j)^2 + \delta_j^2 \cdot (\Delta e_u^2 - m_k')^2}{\delta_j^2 \cdot \delta_k'^2}\right)}}{\sum_{j=1}^{j}\sum_{k=1}^{k} e^{\left(-\frac{\delta_k'^2 \cdot (e_u^2 - m_j)^2 + \delta_j^2 \cdot (\Delta e_u^2 - m_k')^2}{\delta_j^2 \cdot \delta_k'^2}\right)}}$$

$$K_u^i = \sum_{j=1}^{j}\sum_{k=1}^{k} \frac{\theta_{jk}^i \cdot e^{\left(-\frac{\delta_k'^2 \cdot (e_u^2 - m_j)^2 + \delta_j^2 \cdot (\Delta e_u^2 - m_k')^2}{\delta_j^2 \cdot \delta_k'^2}\right)}}{\sum_{j=1}^{j}\sum_{k=1}^{k} e^{\left(-\frac{\delta_k'^2 \cdot (e_u^2 - m_j)^2 + \delta_j^2 \cdot (\Delta e_u^2 - m_k')^2}{\delta_j^2 \cdot \delta_k'^2}\right)}}$$

$$K_u^d = \sum_{j=1}^{j}\sum_{k=1}^{k} \frac{\theta_{jk}^d \cdot e^{\left(-\frac{\delta_k'^2 \cdot (e_u^2 - m_j)^2 + \delta_j^2 \cdot (\Delta e_u^2 - m_k')^2}{\delta_j^2 \cdot \delta_k'^2}\right)}}{\sum_{j=1}^{j}\sum_{k=1}^{k} e^{\left(-\frac{\delta_k'^2 \cdot (e_u^2 - m_j)^2 + \delta_j^2 \cdot (\Delta e_u^2 - m_k')^2}{\delta_j^2 \cdot \delta_k'^2}\right)}}$$

where $e_u$ is a rotation speed deviation at the uth sampling;

$\Delta e_u$ is a variable of the rotation speed deviations between two adjacent sampling periods, i.e., $\Delta e_u = e_u - e_{u-1}$ and $e_0$ is the initial value and $e_0$ equals to 0;

$m_j$ is a mean value of the jth fuzzy subset corresponding to the rotation speed deviation $e_u$, j is a number of fuzzy subsets corresponding to the rotation speed deviation $e_u$ and an optimal interval is $\{j \in N|5 \leq j \leq 11\}$;

$m'_k$ is a mean value of the kth fuzzy subset corresponding to the variable of the rotation speed deviation $\Delta e_u$; k is the number of the fuzzy subsets corresponding to the variable of the rotation speed deviation $\Delta e_u$, and the optimal interval is $\{k \in N|5 \leq k \leq 11\}$;

$\delta_j$ is a standard deviation of the jth fuzzy subset corresponding to rotation speed deviation $e_u$;

$\delta'_k$ is a standard deviation of kth fuzzy subset corresponding to rotation speed deviation variable $\Delta e_u$;

$\theta_{jk}^p$ is a corrected weight coefficient of the proportional parameter;

$\theta_{jk}^i$ is a corrected weight coefficient of the integral parameter;

$\theta_{jk}^d$ is a corrected weight coefficient of the differential parameter;

wherein the controlling parameter tuning module is connected with the adjusting module for rotation speed of seeding shaft, the proportional coefficient $K_u^p$, the integral coefficient $K_u^i$, the differential coefficient $K_u^d$, at the uth sampling are used as the input of the adjusting module for adjusting rotation speed of seeding shaft; the rotation speed deviation inference module is connected with the adjusting module for adjusting rotation speed of seeding shaft, and the rotation speed deviation $e_u$ is used as the input of the adjusting module for adjusting rotation speed of seeding shaft; the adjusting module for rotation speed of seeding shaft converts the input proportional coefficient $K_u^p$, the integral coefficient $K_u^i$, the differential coefficient $K_u^d$ and the rotation speed deviation $e_u$ at the uth sampling into the output of adjusting speed $n_u^a$ by the incremental PID algorithm, wherein:

$$n_u^a = \begin{cases} n_{u-1}^a + K_u^p\left(1 + \frac{T}{K_u^i} + \frac{K_u^d}{T}\right)e_u & u = 1 \\ n_{u-1}^a + K_u^p\left(1 + \frac{T}{K_u^i} + \frac{K_u^d}{T}\right)e_u + K_u^p\left(1 + \frac{2K_u^d}{T}\right)e_{u-1} & u = 2 \\ n_{u-1}^a + K_u^p\left(1 + \frac{T}{K_u^i} + \frac{K_u^d}{T}\right)e_u + K_u^p\left(1 + \frac{2K_u^d}{T}\right)e_{u-1} + & m > u > 2 \\ K_u^p \frac{K_u^d}{T} e_{u-2} & \end{cases}$$

wherein the adjusting module for rotation speed of seeding shaft is connected with the controlling module for controlling rotation speed of seeding shaft, through which the input adjusting rotation speed $n_u^a$ is converted into output of impulse frequency $P_u$;

and the driving motor controller is connected with the controlling module for controlling rotation speed of seeding shaft to control the rotation speed of the driving motor by the pulse signal with the frequency of $P_u$.

2. The monitoring system for planter according to claim 1, wherein the positioning signal receiver is a GPS positioner.

3. The monitoring system for planter according to claim 1, wherein the transmission mode among the positioning signal receiver, the plurality of flow rate sensors, the speed sensor, the acceleration sensor, the encoder and the industrial personal computer are connected by wireless transmission.

4. The monitoring system for planter according to claim 1, wherein the wireless transmission is a Zigbee wireless network transmission.

5. The monitoring system for planter according to claim 1, wherein the sampling period T is 0.02 second.

6. A monitoring method for a planter, which method comprises the following steps:

S01: a decision module for theoretical rotation speed of driving motor converts the geographic position signal input by a positioning signal receiver at an uth sampling into a theoretical seeding amount Q of the area where the uth sampling is located by a look-up table method, wherein Q=f ($N_u$,$E_u$) where $N_u$ is a north latitude coordinate of the planter at the uth sampling and $E_u$ is an east longitude coordinate of the planter at the uth sampling;

S02: an unit speed fusion module converts input driving wheel rotation speed $n_u$ and driving wheel acceleration rotation speed $a_u$ of the planter at the uth sampling into planter speed $v_u$ at the uth sampling by the speed fusion algorithm, wherein:

$$v_u = \begin{cases} \pi \cdot n_u \cdot D & \left|\frac{\pi \cdot D \cdot (n_u - n_{u-1})}{T} - a_u\right| \leq 2 \\ v_{u-1} + a_u \cdot T & 2 < \left|\frac{\pi \cdot D \cdot (n_u - n_{u-1})}{T} - a_u\right| \end{cases}$$

where $n_u$ is a driving wheel rotation speed of planter at an uth sampling, round/min;

$n_{u-1}$ is a driving wheel rotation speed of planter at an (u−1)th sampling, round/min; when u equals to 1, $n_0$ equals to 0;

D is a driving wheel diameter of the planter, m;

$a_u$ is an acceleration rotation speed of the planter at the uth sampling, m/s$^2$;

$V_{u-1}$ is a speed of planter at (u−1)th sampling, m/s; when u equals to 1, $v_0$ equals to 0;

u is a current sampling number of times, 1≤u≤m, m is a total sampling number of times, and sampling period T is a time interval from (u−1)th sampling to uth sampling, and T is a constant;

S03: a flow rate sensor is used to measure flow rate of each seeding opening of the planter at the uth sampling; the flow rate is input to a seeding flow rate monitoring module and is converted to total seeding amount $q_u$ at an uth sampling by the seeding flow rate monitoring module;

S04: the theoretical seeding amount Q in an area, total seeding amount $q_u$ and speed $v_u$ of the planter at the uth sampling are used as an input of the decision module for a theoretical rotation speed of drive motor; the theoretical drive motor rotation speed $n_u^t$ is output by driving motor rotation speed algorithm, wherein:

$$n_u^t = \frac{60 \cdot \left(Q - \sum_{u=1}^{n} q_u\right) \cdot v_u \cdot A}{\left(666.7 - A \cdot \sum_{u=1}^{n} v_u\right) \cdot N \cdot q \cdot r}$$

where Q is a theoretical seeding amount in an area, kg;

$q_u$ is a total seeding amount at the uth sampling, kg;

$v_u$ is a speed of planter at the uth sampling, m/s;

A is a working width of planter, m;

q is a theoretical seeding amount per round of a single row of seeding shafts, kg;

N is the number of seeding rows of the planter;

r is a transmission ratio between the seeding shaft drive motor and the seeding shaft;

S05: a rotation speed deviation $e_u$ is obtained via a differential gate operation by inputting the drive motor theoretical rotation speed $n_u^t$ the actual speed $n_u^r$ feedback by the encoder into the rotation speed deviation inference module, wherein $e_u = n_u^t - n_u^r$;

S06: a rotation speed deviation $e_u$ is input to the controlling parameter tuning module; through the calculation of fuzzy neural network, the proportional coefficient $K_u^p$, the integral coefficient $K_u^i$ and the differential coefficient $K_u^d$ at the uth sampling are obtained, wherein:

$$K_u^p = \sum_{j=1}^{j} \sum_{k=1}^{k} \frac{\theta_{jk}^p \cdot e^{\left(-\frac{\delta_k'^2 \cdot (e_u^2 - m_j)^2 + \delta_j'^2 \cdot (\Delta e_u^2 - m_k')^2}{\delta_j'^2 \delta_k'^2}\right)}}{\sum_{j=1}^{j} \sum_{k=1}^{k} e^{\left(-\frac{\delta_k'^2 \cdot (e_u^2 - m_j)^2 + \delta_j'^2 \cdot (\Delta e_u^2 - m_k')^2}{\delta_j'^2 \delta_k'^2}\right)}}$$

$$K_u^i = \sum_{j=1}^{j} \sum_{k=1}^{k} \frac{\theta_{jk}^i \cdot e^{\left(-\frac{\delta_k'^2 \cdot (e_u^2 - m_j)^2 + \delta_j'^2 \cdot (\Delta e_u^2 - m_k')^2}{\delta_j'^2 \delta_k'^2}\right)}}{\sum_{j=1}^{j} \sum_{k=1}^{k} e^{\left(-\frac{\delta_k'^2 \cdot (e_u^2 - m_j)^2 + \delta_j'^2 \cdot (\Delta e_u^2 - m_k')^2}{\delta_j'^2 \delta_k'^2}\right)}}$$

-continued $$K_u^d = \frac{\sum_{j=1}^{j}\sum_{k=1}^{k} \theta_{jk}^d \cdot e^{\left(-\frac{\delta_k'^2 \cdot (e_u^2-m_j)^2+\delta_j^2 \cdot (\Delta e_u^2-m_k')^2}{\delta_j^2 \cdot \delta_k'^2}\right)}}{\sum_{j=1}^{j}\sum_{k=1}^{k} e^{\left(-\frac{\delta_k'^2 \cdot (e_u^2-m_j)^2+\delta_j^2 \cdot (\Delta e_u^2-m_k')^2}{\delta_j^2 \cdot \delta_k'^2}\right)}}$$

where $e_u$ is a rotation speed deviation at the uth sampling;
$\Delta e_u$ is a variable of the rotation speed deviations between two adjacent sampling periods, i.e., $\Delta e_u = e_u - e_{u-1}$ and $e_0$ is an initial value and $e_0$ equals to 0;
$m_j$ is a mean value of the jth fuzzy subset corresponding to a rotation speed deviation $e_u$, j is a number of fuzzy subsets corresponding to the rotation speed deviation $e_u$ and an optimal interval is $\{j \in N | 5 \leq j \leq 11\}$;
$m'_k$ is a mean value of a kth fuzzy subset corresponding to the variable of the rotation speed deviation $\Delta e_u$; k is a number of the fuzzy subsets corresponding to the variable of the rotation speed deviation $\Delta e_u$, and an optimal interval is $\{k \in N | 5 \leq k \leq 11\}$;
$\delta_j$ is a standard deviation of the jth fuzzy subset corresponding to rotation speed deviation $e_u$;
$\delta'_k$ is a standard deviation of kth fuzzy subset corresponding to rotation speed deviation variable $\Delta e_u$;
$\theta_{jk}^p$ is a corrected weight coefficient of the proportional parameter;
$\theta_{jk}^i$ is a corrected weight coefficient of the integral parameter;
$\delta_{jk}^d$ is a corrected weight coefficient of the differential parameter;

S07: a proportional coefficient $K_u^p$, an integral coefficient $K_u^i$, a differential coefficient $K_u^d$, and the rotation speed deviation $e_u$ at the uth sampling are input to the adjusting module for rotation speed of seeding shaft and converted into the output of adjusting rotation speed $n_u^a$ by the incremental PID algorithm, wherein:

$$n_u^a = \begin{cases} n_{u-1}^a + K_u^p\left(1+\frac{T}{K_u^i}+\frac{K_u^d}{T}\right)e_u & u=1 \\ n_{u-1}^a + K_u^p\left(1+\frac{T}{K_u^i}+\frac{K_u^d}{T}\right)e_u + K_u^p\left(1+\frac{2K_u^d}{T}\right)e_{u-1} & u=2 \\ n_{u-1}^a + K_u^p\left(1+\frac{T}{K_u^i}+\frac{K_u^d}{T}\right)e_u + K_u^p\left(1+\frac{2K_u^d}{T}\right)e_{u-1} + & m>u>2 \\ K_u^p\frac{K_u^d}{T}e_{u-2} & \end{cases}$$

S08: an input adjusting rotation speed $n_u^a$ is converted into output of impulse frequency $P_u$ by the controlling module for rotation speed of seeding shaft; the drive motor controller controls the rotation speed of the driving motor by the pulse signal with the frequency of $P_u$; the encoder outputs the feedback of actual rotational speed $n_u^r$ to the rotation speed deviation inference module;
S09: if u<m, an (u+1)th sampling period is started, the mentioned steps S01 to S08 are executed circularly; if or the computer receives a stop command, the planter stops the seeding operation.

\* \* \* \* \*

UNITED STATES PATENT AND TRADEMARK OFFICE
CERTIFICATE OF CORRECTION

PATENT NO. : 11,464,156 B2
APPLICATION NO. : 16/474514
DATED : October 11, 2022
INVENTOR(S) : Hu et al.

It is certified that error appears in the above-identified patent and that said Letters Patent is hereby corrected as shown below:

In the Claims

Claim 6, Column 20, Line 29-30, "are executed circularly; if or the computer" should be --are executed circularly; if $u=m$ or the computer--.

Signed and Sealed this
Twenty-fourth Day of September, 2024

Katherine Kelly Vidal
*Director of the United States Patent and Trademark Office*